United States Patent [19]
Weigert

[11] Patent Number: 5,234,050
[45] Date of Patent: Aug. 10, 1993

[54] AUTOMATIC CLIMATE CONTROL SYSTEM
[75] Inventor: Hans Weigert, Ridgewood, N.J.
[73] Assignee: Interdynamics, Inc., Brooklyn, N.Y.
[21] Appl. No.: 756,034
[22] Filed: Sep. 6, 1991
[51] Int. Cl.[5] .............................................. F25B 29/00
[52] U.S. Cl. ................................... 165/26; 236/49.3; 454/75
[58] Field of Search .......................... 236/49.3; 454/75; 165/43, 26

[56]  References Cited
U.S. PATENT DOCUMENTS
4,375,754  3/1983  Okura ................................ 165/43 X
4,901,788  2/1990  Doi .................................... 454/75 X Primary Examiner—William E. Wayner
Attorney, Agent, or Firm—Henry R. Lerner

[57]  ABSTRACT

An aftermarket automatic climate control system is disclosed for use in automobiles to be connected to existing heating, including a fan and fan motor to control the volume of air flow, said system including a control head located in the passenger compartment and a power box adapted to be connected with the automobile's electrical, heating and air conditioning systems, wherein said automatic climate control is connected to the fan positive supply lead of the fan motor.

12 Claims, 5 Drawing Sheets

AUTOMATIC CLIMATE CONTROL SYSTEM

BACKGROUND OF THE INVENTION

This invention relates to an automobile climate control system and, more particularly, to such a system which can be added as an after market item to existing auto air conditioning systems.

There currently exist automobile climate control systems installed as original equipment. There also exists automobile air conditioning/heating systems in which the driver controls the operation of the system to achieve desired ambient conditions. This necessitates sometime frequent changes to fan speed, air duct flow, temperature settings and the like.

The also exists after market climate control systems which are specifically engineered for certain automobile air conditioning units. These devices are quite complicated and are system specific.

An object of this invention is to provide an after market auto climate control system which is universal and can work with most, if not all, preexisting auto air conditioning systems.

Another object of this invention is to provide such a system which is easy and safe to install.

Another object of this invention is to provide a continuous fan speed control to minimize intrusiveness when the fan speed changes.

Still another object of this invention is to organize the components of the system most efficiently such that the major power consuming elements are located away from the driver and passengers while a portion of the control system is located near the driver, with that portion near the driver being small and primarily serving as the source of control signals for the unit.

These and other objects are accomplished by providing an automatic climate control system which is installed by merely connecting the system with preexisting operating circuits in the auto. In the embodiment illustrated, this can be accomplished by making only four electrical connections to insert the invention into the auto's air conditioning system. In another embodiment, only three electrical connections need be made.

The automatic climate control system includes stepless control of the fan motor to achieve and maintain accurate ambient temperature conditions. The climate control works for both heating and cooling and allows the motor to quietly and automatically adjust its operation in response to the automobile's ambient temperature conditions.

A feature of this invention is the universality of the system for after market installation, allowing a single unit to adapt to most existing air conditioning/heating units. One manner in which such universality is achieved is by providing a system which is blind to the automobile, heating and cooling systems and merely requires identifying the terminal for the high side of the fan.

The system comprises two main components, one being a control head which incorporates the automatic temperature setting control easily accessible to the driver, while the other component is the power box which includes electronic circuitry for achieving the desired fan speed control operation. Additionally, a stalk assembly may be provided to allow the ambient temperature sensor to be placed in any desired position to closely control the interior temperature of the automobile.

DETAILED DESCRIPTION

Figure 1:
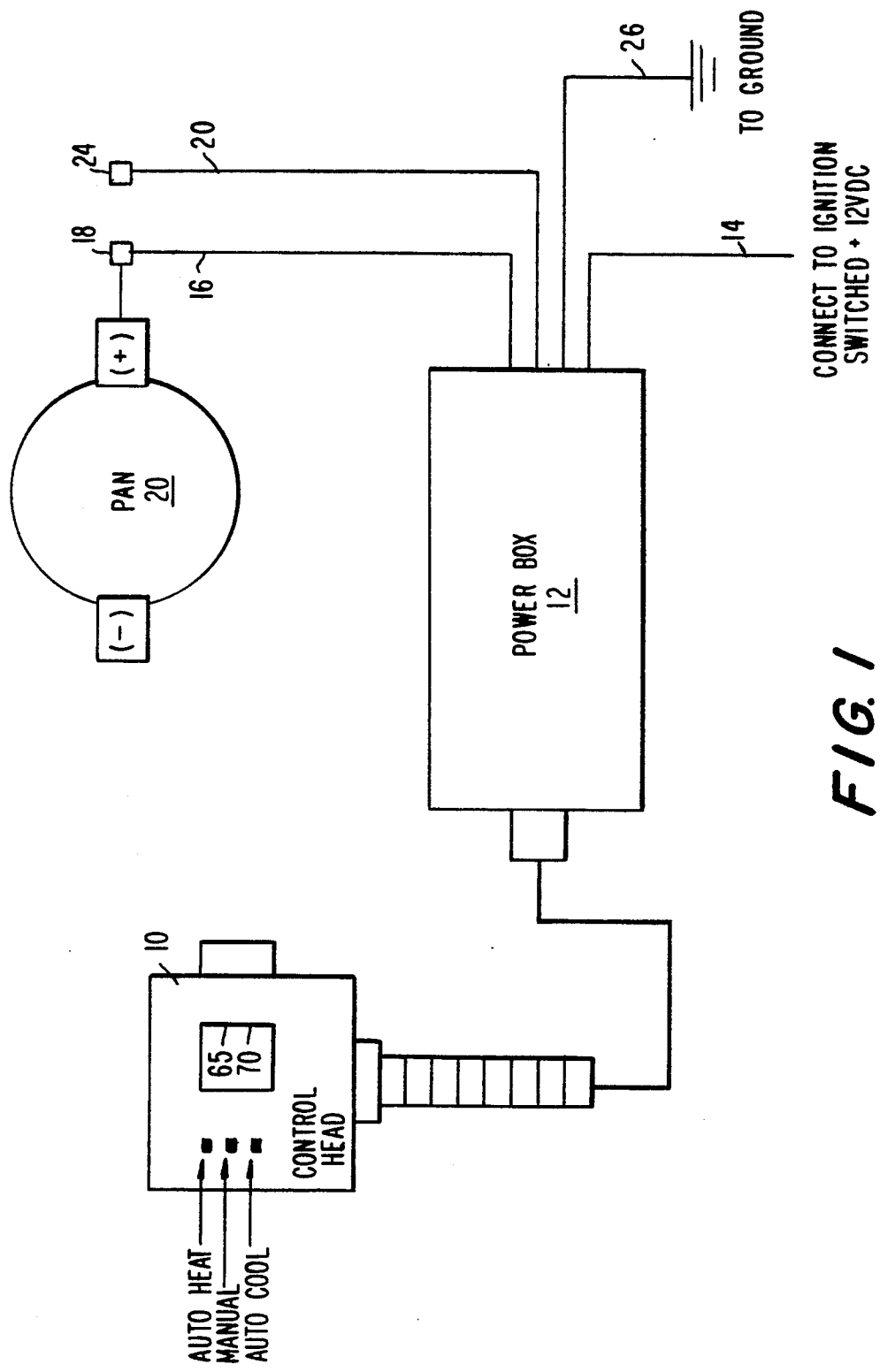
FIG. 1 is a block diagram of the components of this invention for insertion into the electrical system of the auto.

FIG. 1 is a block diagram illustrating the primary independent elements of this invention which is connected to the automobile heating/air conditioning system. There is shown a control head 10 which is connected to a power box 12, the output of which is connected to automobile's heating/cooling system. The power box and control head are blind to the auto system, and the control head is located in the passenger compartment. The control head generates a signal indicating that the automatic climate control system should operate to change the ambient temperature in the auto.

One lead 14 from the power box 12 is connected to the ignition switch plus 12 volts DC. Another lead 16 of the power box 13 is connected to the high power side or fan positive supply terminal 18 of a fan 20, and another lead 22 is connected to the OEM positive fan wire 24. Yet another lead 26 of the power box 12 is connected to ground. In this manner, the automatic climate control system of this invention which comprises the power box and control head are inserted in series with the high side of the fan motor, and the automatic climate control system of this invention is blind to the system in which it is connected so long as there exists a high side connection to the fan circuit. All that is required to achieve this blindness is that the high side of the fan be located, and the wires connected thereto be cut to form junctions 18 and 24. Control of the speed of the fan motor is by the system of this invention, although a manual override is provided to block the effects of the system of this invention. Universality is thus achieved for this invention, such that it can be connected as an aftermarket item with any existing heating/air conditioning system.

Figure 2:
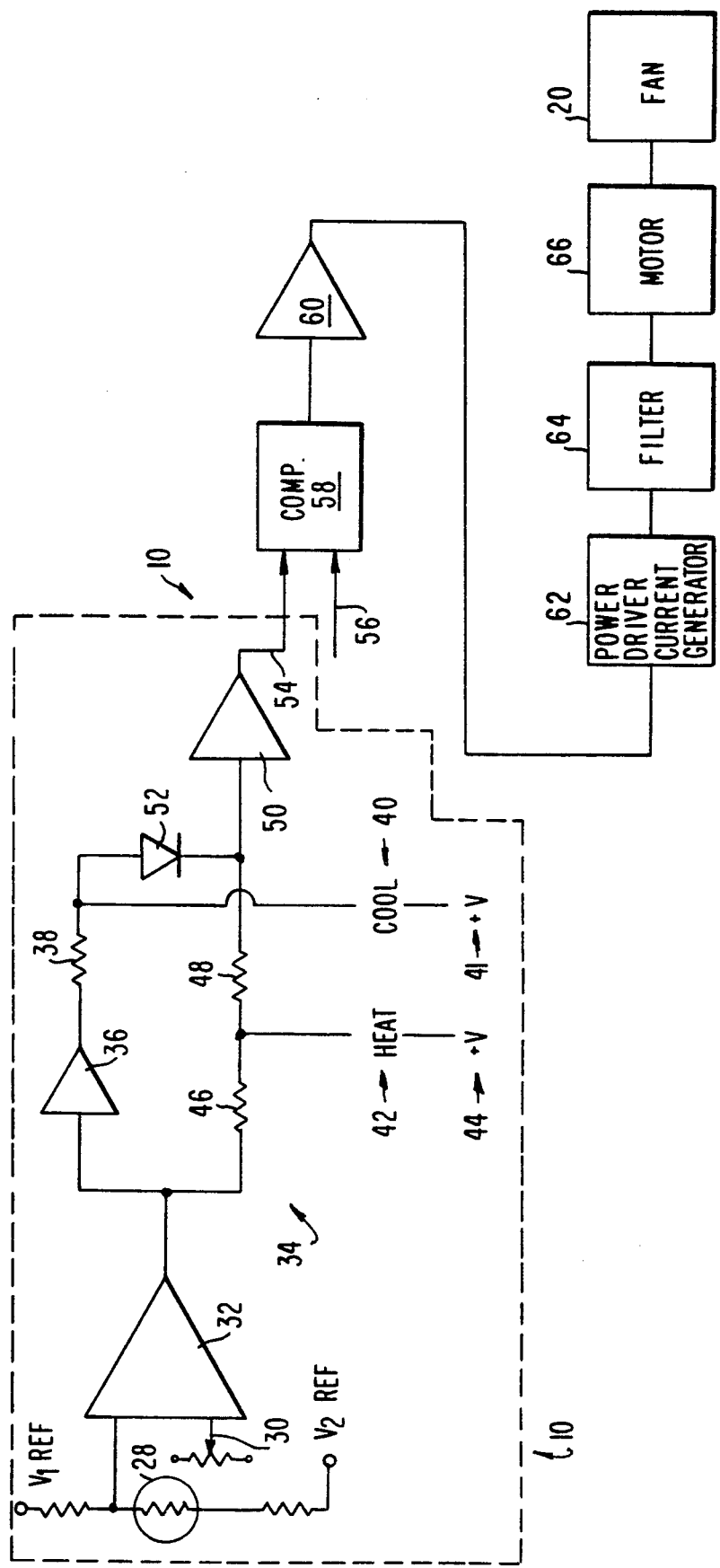
FIG. 2 is a schematic diagram of one embodiment of the Automatic Climate Control System in accordance with the invention.

FIG. 2 is a block diagram of the control head position 10 of this invention. There is provided a thermistor 28 which is located in the passenger portion of the auto to sense the ambient temperature. A temperature setting input 30 is manually controlled by the driver, and an error signal is developed in operational amplifier 32. The output of the operational amplifier 32 is connected to a dual path circuit 34, one path being for cooling control and the other for heating control. An amplifier 36 with an output resistor 38 is connected in the cooling path which operates when the cool position switch 40 is not connected to +5 v 41 while the heat position 42 is connected to a positive source of voltage 44. A pair of resistors 46 and 48 are connected in series in the heat path, and when the cooling path is used, the positive voltage 44 raises the level of the voltage at the input of an amplifier 50 so that the same positive reference voltage is carried through to control the motor whether the system is in the heating or cooling modes. A diode 52 has its anode connected to resistor 38 and its cathode connected to the input of amplifier 50. As thus described, a fan control signal is developed at the output 54 of amplifier 50. To this point, the block diagram described forms the control head 10 (shown in dotted lines) which is a low power consumption device adapted to be located near the driver, perhaps mounted on a stalk to be movable or fixedly mounted on the dashboard.

A triangular reference signal 56 is provided by this system, (FIG. 4) and is supplied as a second input to a comparator 58, the first input of which is connected to receive the fan speed control signal appearing at 54. The comparator 58 generates a varying width pulse determined by amplitude location at which the fan speed control signal intersects the triangular reference signal 56. This varying width pulse at the output of comparator 58 is supplied through a pulse amplifier 60 to a power driver voltage generator 62, the output of which passes through a filter 64 to control fan motor circuit 66 which in turn drives fan 20. Thus, a pulse width modulated signal is developed at the output of comparator 58 which continuously varies the fan speed without abrupt transitions. The width of the pulse is related to the fan speed control signal developed at 54 FIG. 2 is response to the error signal developed at the input of operational amplifier 32. This fan speed motor control signal is developed whether the automatic climate control works in the heat or cool mode.

Figure 3:
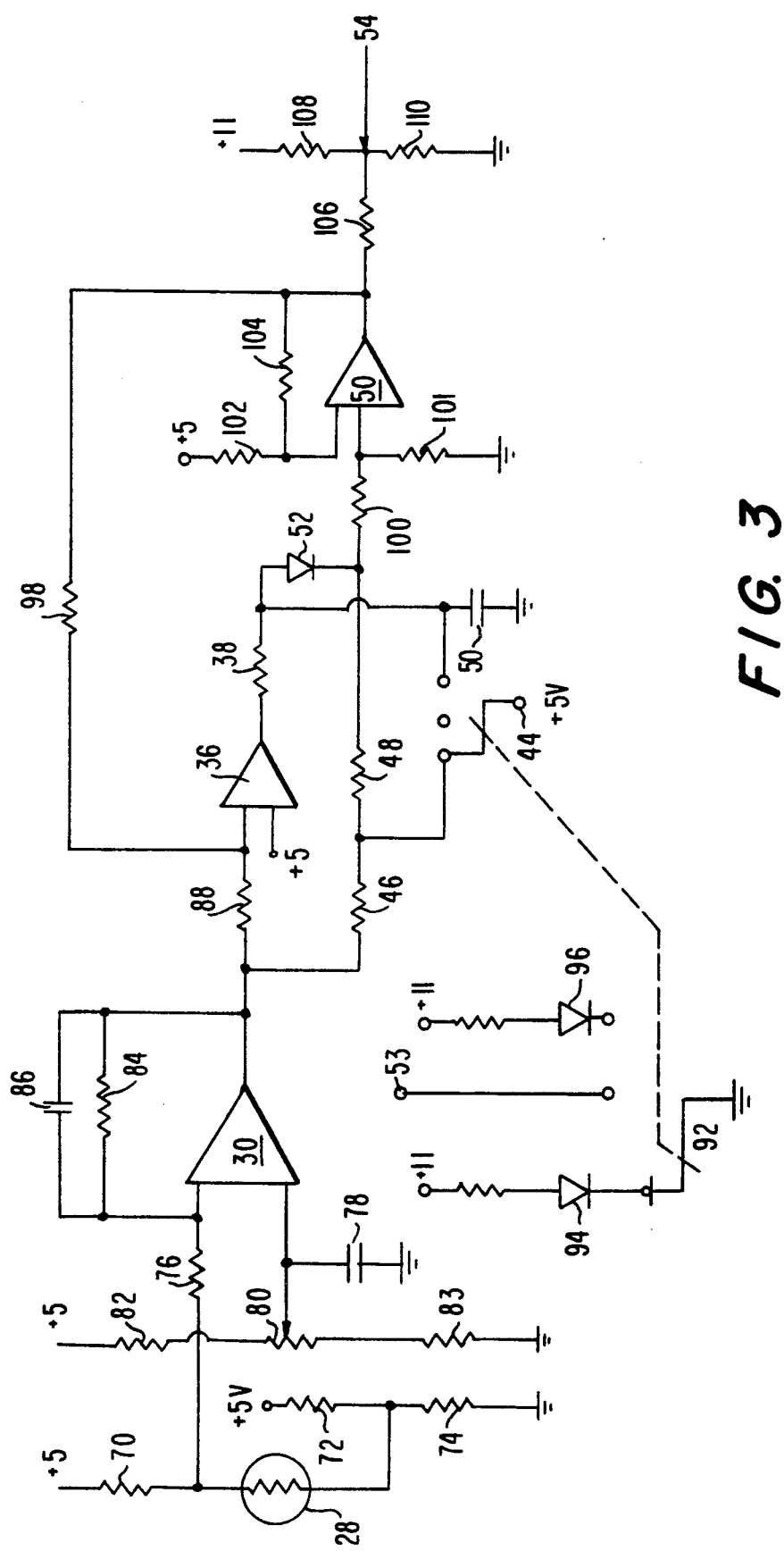
FIG. 3 is a schematic diagram of another embodiment of the Automatic Climate Control System.

FIG. 3 is a schematic diagram of a preferred embodiment of the control head portion 10 of this invention. This invention concerns the sensing of ambient temperature, and to that end, precision thermistor 28 is connected through a resistor 70 to a regulated source of positive 5 volts, with the other side of the thermistor 28 being connected to a bridge formed between resistors 72 and 74. One side of resistor 72 is connected to ground, while one side of resistor 74 is connected to plus 5 volts. The connection point between resistor 70 and thermistor 28 is connected through a resistor 76 to the negative input of amplifier 30, the positive input of which is connected between the wiper arm of a variable resistor 80. A capacitor 78 is connected to the wiper arm of variable resistor 80 and to ground. One side of variable resistor 80 is connected through a resistor 82 to plus 5 volts, while the other side of resistor 80 is connected through a resistor 83 to ground. Variable resistor 80 is used to set a desired ambient temperature, while thermistor 28 determines the actual temperature.

The difference formed between the setting on variable resistor 80 and the actually sensed temperature detected by thermistor 28 are fed as inputs to amplifier 30. This "error signal" is used to adjust the ambient temperature produced in the passenger compartment of the automobile. Resistor 70 is selected to provide a substantially constant current for thermistor 28, and the lower terminal of thermistor is connected a bias voltage developed across resistors 72 and 74. By varying this bias voltage, the temperature scale can be adjusted to be in agreement with the actual temperature.

A conventional feedback circuit is provided between the output of amplifier 30 and its inverting input, the feedback circuit comprising a resistor 84 which is connected in parallel with a capacitor 82.

The output of the amplifier 30 is an amplified error signal developed as a consequence of the difference between that set in variable resistor 80 and that provided by thermistor 28. The output of amplifier 30 is fed through resistor 80 to the inverting input of the amplifier 36. The non-inverting input of amplifier 36 is connected to positive 5 volts. The output of amplifier 36 is connected through a resistor 38 to diode 52, the cathode of which is connected through previously described resistors 48 and 46 connected in series to the output of amplifier 30. A switch 40 is either in the heat, off, or cool positions. The switch 40 is ganged to a switch 92 which is connected to operate light emitting diodes 94 and 96 indicating the mode of operation of the automatic control system.

The above described path through resistor 88 is used to control the fan speed during the cooling operation, and the gain of this path is controlled by feedback resistor 98 connected between the output of amplifier 50 and the negative input of amplifier 36.

The signal at the cathode side of diode 52 is connected through resistor 100 to the non-inverting input of amplifier 50, while the inverting input is connected similarly through a resistor 102 to a source of positive voltage. Resistor 101 is connected between the non-inverting input of amplifier 50 and ground. The output of amplifier 50 is also connected through resistor 104 to its inverting input. The output of amplifier 50 is also connected through a resistor 106 to a voltage divider formed by resistors 108 and 110. The voltage divider is connected to a positive voltage and sets the range of the fan speed voltage signal.

The control voltage is continuously variable, and the continuously variable control voltage enables the fan speed to be continuously controlled both during heating and cooling. The control characteristic is inverted when passing from heating to cooling, and the ganged switches 40 and 92 move between those positions.

As described above, the fan speed is controlled in a continuous manner, and a pulse width modulated signal is employed to achieve such continuous control. Such an approach minimizes heat dissipation, and considering the environment in which the device operates, minimizing heat dissipation is an advantageous objective.

The circuitry employed to meet the objectives of the automatic climate control system of this invention, including the generation of a pulse width modulator signal to control the motor requires a dependable voltage in excess of that generally provided by the 12 volt battery in the car. Hence, the 12 volt battery is used as part of the source for the driving the automatic climate control system, and an auxiliary voltage is generated which will enable the output transistors to be driven under optimum conditions. As designed in the preferred embodiment of this invention, an auxiliary voltage of approximately 9 volts is generated.

Figure 4:
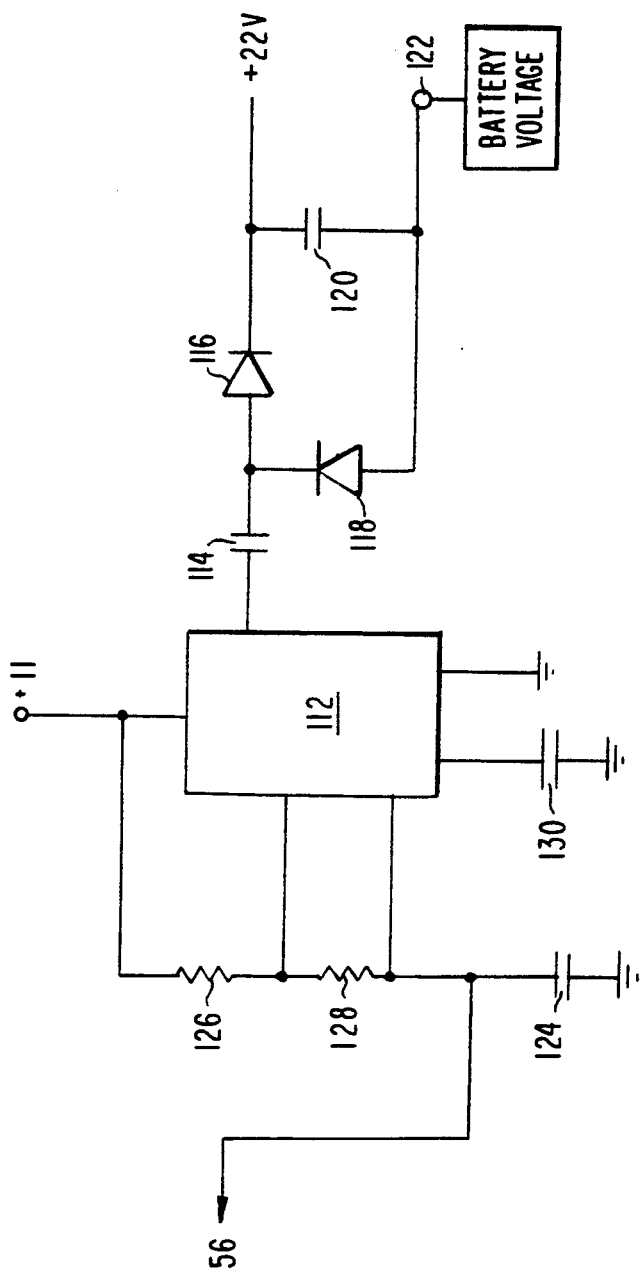
FIG. 4 is a diagram of a source of auxiliary power and a triangular waveform used in this invention.

A schematic diagram of an auxiliary voltage circuit is shown in FIG. 4. This circuit houses a 555 type integrated circuit 112 which is connected to run as an oscillator. The output of the integrated circuit 112 is rectified to generate the auxiliary 22 volts voltage. One output at a pin of integrated circuit 112 is coupled through the rectifier circuit to be described. The output at such pin is connected through a capacitor 114 to a connection between the anode of a diode 116 and the cathode of a diode 118. The cathode of diode 116 and the anode of diode 118 are connected across a capacitor 120 to generate the total voltage which is approximately 22 volts. In particular, the battery voltage is connected at terminal 122 when the ignition is turned on and the battery voltage is connected to the anode of diode 118, and the voltage generated at the cathode of diode 116 and at the anode of diode 118 are summed so that the voltage at the cathode of diode 116 is approximately 22 volts.

As described above, the integrated circuit 112 operates as an oscillator, and an approximately triangular waveform is developed across capacitor 124 which is connected to a pin output of integrated circuit 112. Resistor 126 is connected between a regulated positive source of voltage, approximately 11 volts, and a pin input to of the integrated circuit, while resistor 128 is connected to the same pin input and to another pin of the integrated circuit 112. A capacitor 130 is connected between a pin and ground, while another pin of integrated circuit 112 is connected to ground.

Since the supply voltage to integrated circuit 112 is a regulated 11 volts, the voltage developed across capacitor 120 is approximately 9 volts. As described above, this voltage is added to the battery to yield an auxiliary voltage of approximately 22 volts. The components of the oscillator are not exposed to voltage spikes which can develop in the electrical system of the automobiles, so that the approximately 22 volts are substantially controlled and constant.

An approximately triangular wave form is, as described above, developed across capacitor 124. This voltage will, preferably, lie between approximately 3.67 volts at the lower peak and 7.3 volts at the upper end of the triangular wave. As is understood, such voltage levels are described as part of the preferred embodiment, and other voltage levels may be chosen.

The fan control speed signal 54 developed by the control head, as designed in this preferred embodiment, lies between approximately 2.4 volts which signifies zero fan speed command and 4.5 volts which signifies full drive for the fan speed. The fan speed control signal developed by the control head is supplied on lead 54 to one input of voltage comparator 58. (See FIG. 5). The previously mentioned triangular wave derived across comparator 124 is connected to the other input of comparator 58. A voltage divider comprising resistors 140 and 142 with their connection connected to said other input of comparator 58 is provided. Additionally, a parallel connection of resistor 141 and capacitor 143 is connected between the output and one input of comparator 58.

When the triangular wave drops below the level of the fan speed control voltage, the output voltage of comparator 58 will approach +11 volts. The output of comparator 58 is connected through a resistor 144 to the base of an NPN transistor 146. A capacitor 148 is connected across resistor 144, and a resistor 150 is connected between a source of 11 volts and the output of comparator 58. The collector voltage of transistor 146 is applied to the bases of two emitter followers 152 and 154, which can supply a low impedance output to the gate of a power MOSFET 156. In particular, the collector of transistor 146 is directly connected tot he base of PNP transistor 162 and through a resistor 158 to the base of NPN transistor 154. Resistor 160 is connected between the base of NPN transistor 154 and the positive 22 volts source. The emitter of transistor 152 is connected through resistor 162 to one end of resistor 164. The common connection between resistors 162 and 164 is connected through a resistor 166 to MOSFET 156.

The output of comparator 58 is also connected through a capacitor 168 and through a resistor 170 to the 22 volt source. Additionally, the junction between capacitor 168 and resistor 170 is connected through a resistor 172 to the anode of a diode 174, the cathode of which is connected to the 22 volt source. The anode of diode 174 is also connected to the base of an NPN transistor 176, the emitter of which is connected to the 22 volt source. The collector of transistor 176 is connected through resistor 158 to the collector of NPN transistor 146.

When the output of comparator 58 makes a rapid transition from +11 v to ground, the base of transistor 176 is fed a short pulse of current through capacitor 168 and resistor 172. This will insure that the collector of collector of transistor 146 will be rapidly pulled toward plus 22 volts. The transition period from the positive level to ground and vice versa at the gates of the output gates of MOSFET 156 should be kept to a minimum so as to reduce the switching losses in the MOSFET. When the output voltage of comparator 58 rises, the inherent gain of transistor 146 will provide a fast negative going transition at the collector of transistor 146.

The pulses developed at the emitters of transistors 152 and 154 are fed through suppressor resistor 166 to the gate of the power MOSFET. Although only a single power MOSFET is shown, it is anticipated that a plurality of these devices will be connected in parallel to provide sufficient drive current for the fan motor.

The power MOSFET is operated as a source follower, hence its drain is are connected to the battery plus voltage leads which originally supply the fan. In order to install the power control unit, this lead is cut as at 180, and that side of the lead which is connected to the ignition switch or other source of voltage supply is connected to the drain mentioned above. Capacitors 182 and 184 are connected across the output of the MOSFET and are used to supply the high frequency component of the drive current to help eliminate radiated noise.

The source of the power MOSFET 156 connected to an inductor 186. Inductor 186, coupled with capacitor 188 filters the output of the MOSFET 1556 so that the fan sees only direct current. The power head circuitry is connected to the automobile's circuits to render this invention universal and system blind. In particular, the terminal 180 is connected to a capacitors 182 and 184. The other ends of capacitors 182 and 184 are connected together and to a common end of capacitors 190 and 192. This common end is connected through to the anode of a flyback diode 194, the cathode of which is connected to the source of the power MOSFET.

Inductor 200 and capacitors 190 and 192 serve as filter between the B+ input from the ignition switch at 202 and the system in order to suppress unwanted spikes which may cause destruction of the system. The invention has, as a primary advantage over the prior act, a universal feature which allows the system to be installed ion any system in which one can locate the B+ from the ignition switch 14, (FIG. 1), ground 26, and high side lead of the input motor, 16 and 22.

Another embodiment aspect of the invention permits the climate control system to be connected either in series with the automobile panel controls, as shows, in FIGS. 2–5 or in shunt with the panel controls.

Figure 5:
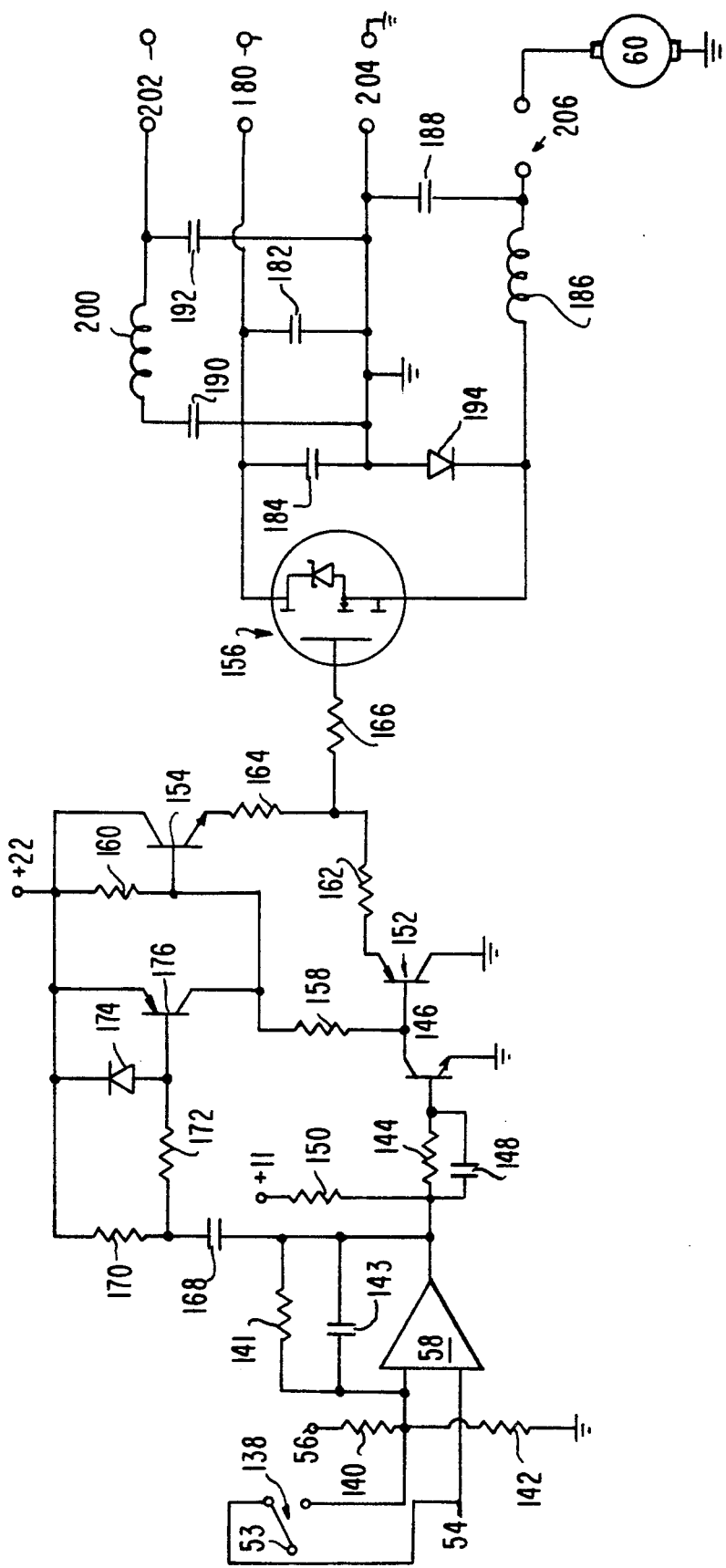
FIG. 5 is a schematic diagram of the power box of the climate control circuit of this invention.

Referring to FIGS. 3 and 5: On FIG. 3 the center position of switch 92 connects point 53 to ground and the automatic temperature control is defeated since neither heating nor cooling are required.

In FIG. 5, the lead 53 is shown connected to switch 138 which applies ground to either the inverting or the non-inverting inputs of the comparator when switch 92 (FIG. 3) is in the center position. When the fan speed control voltage through lead 54 is grounded, then the output transistor 156 is cut off and no voltage will be applied to the fan. For this condition of operation, lead 20, (FIG. 1) is connected with lead 14 to the +12 volts supply directly. There is no cut made in the fan positive supply lead. In this manner the fan speed can be controlled either by the automatic temperature control system or by the driver of the automobile through his normal panel control. When switch 92 is in the center position, then the fan speed will be controlled solely by the driver and the automatic climate control system does not impact the ambient temperature in the auto.

When switch 138 grounds the triangular wave input to comparator 58, then transistor 156 will be fully on. In this case the driver of the automobile will have normal control of the fan speed through the instrument panel control. It should be noted that for this mode of operation, illustrated in FIG. 1, the driver's panel fan speed control must be in the full ON position for the automatic system to operate up to the full fan speed drive. This full ON position is not required when the system is operated in the shunt mode.

While the above figures illustrate a preferred embodiment of the invention, variation and modification can be made without departing from the scope of the invention as set forth in the appended claims.

As a further explanation of this preferred embodiment the following is a list of component values which can be employed in this invention.

| Component Numeral | Value |
| --- | --- |
| 38 | 1.0 Kohm |
| 46 | 10.0 Kohm |
| 48 | 10.0 Kohm |
| 70 | 15.0 Kohm |
| 72 | 2.43 Kohm |
| 74 | 1.21 Kohm |
| 76 | 100.0 Kohm |
| 80 | 2.0 Kohm |
| 82 | 18.0 Kohm |
| 83 | 100.0 Kohm |
| 84 | 3.9 Mohm |
| 86 | |
| 88 | 20.0 Kohm |
| 98 | 68.0 Kohm |
| 100 | 82.0 Kohm |
| 101 | 330.0 Kohm |
| 102 | 100.0 Kohm |
| 104 | 330.0 Kohm |
| 106 | 43.0 Kohm |
| 108 | 56.0 Kohm |
| 110 | 22.0 Kohm |
| 114 | 2.2 uF |
| 120 | 10.0 uF |
| 126 | 2.2 Kohm |
| 128 | 8.2 Kohm |
| 130 | .01 uF |
| 140 | 22.0 Kohm |
| 141 | 330.0 Kohm |
| 142 | 39.0 Kohm |
| 143 | 22.0 pF |
| 144 | 10.0 Kohm |
| 148 | 150.0 pF |
| 150 | 4.7 Kohm |
| 162 | 10.0 ohm |
| 164 | 10.0 ohm |
| 166 | 20.0 ohm |
| 168 | 470.0 pF |
| 170 | 10.0 Kohm |
| 172 | 1.0 Kohm |
| 182 | 210.0 uF |
| 184 | 1.0 uF |
| 186 | 20.0 uF |
| 188 | 277.0 uF |
| 190 | 220.0 uF |
| 192 | 0.1 uF |

I claim:

1. An aftermarket automatic climate control system for use in automobiles in which there is existing heating, air conditioning, a fan and fan motor to control the volume of air flow, said system comprising
    a control head comprising means to sense the ambient temperature and generate a corrective signal, said control head located in the passenger compartment to be controlled thereby,
    a power box comprising electrical circuit means to be connected to said electrical, heating and air conditioning systems by being connected to the fan motor circuit, said power box including means responsive to said corrective signal to generate a fan motor control signal,
    said automatic climate control system being universal by being connected as an aftermarket product to said fan motor circuit wherein said automatic climate control is connected to the fan positive supply lead of the fan motor.

2. The system as set forth in claim 1, wherein said power box is inserted in series with said fan motor circuit.

3. The system as set forth in claim 1, wherein said power box is inserted in shunt with said fan motor circuit.

4. The system as set forth in claim 1, wherein said climate control system comprises means to continuously control the fan speed.

5. The system as set forth in claim 4, wherein said means to continuously control the fan speed comprises a pulse width modulation system.

6. The system as set forth in claim 1, wherein said climate control system is operable by being connected to the battery voltage supply, to the automobile's ground system and to the fan motor circuit.

7. The system as set forth in claim 1, wherein the power box is located remotely from the passenger compartment of the automobile.

8. The system as set forth in claim 1, wherein said automatic climate control system comprises means to operate to automatically increase or decrease the temperature in the passenger compartment by operating in a heating or cooling mode, further comprising switching means to cut off the operation of said climate control system and manually operate the air conditioning-/heating systems of the automobile.

9. The system as set forth in claim 5, wherein said pulse width modulation system comprises a comparator, one input of which is supplied with an oscillating signal, the other input of which is supplied with a fan control signal, said comparator producing a pulse whose width is determined by the intersection of the amplitudes of said fan control and oscillating signals.

10. The system as set forth in claim 9, wherein said oscillating signal comprises means to produce a triangular waveform.

11. The system as set forth in claim 1, wherein said automatic climate control system comprises at least one power MOSFET to provide sufficient current to control said fan motor speed.

12. A system as set forth in claim 1, wherein said fan motor is set to operate at maximum speed and said aftermarket automatic climate control system controls the actual speed of said fan motor.

* * * * *